United States Patent
Seitter et al.

(10) Patent No.: US 11,512,790 B2
(45) Date of Patent: Nov. 29, 2022

(54) VALVE DEVICE FOR A GASEOUS MEDIUM, AND TANK DEVICE FOR STORING COMPRESSED FLUIDS

(71) Applicant: Robert Bosch GmbH, Stuttgart (DE)

(72) Inventors: Max Seitter, Muehlacker (DE); Friedrich Muehleder, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/289,157

(22) PCT Filed: Oct. 9, 2019

(86) PCT No.: PCT/EP2019/077293
§ 371 (c)(1),
(2) Date: Apr. 27, 2021

(87) PCT Pub. No.: WO2020/088897
PCT Pub. Date: May 7, 2020

(65) Prior Publication Data
US 2021/0388917 A1 Dec. 16, 2021

(30) Foreign Application Priority Data
Oct. 29, 2018 (DE) ...................... 10 2018 218 425.9

(51) Int. Cl.
*F16K 31/00* (2006.01)
*F16K 1/42* (2006.01)
(Continued)

(52) U.S. Cl.
CPC .............. *F16K 31/002* (2013.01); *F16K 1/42* (2013.01); *F16K 27/02* (2013.01); *F17C 13/04* (2013.01);
(Continued)

(58) Field of Classification Search
CPC .......... F16K 31/002; F16K 1/42; F16K 27/02; F17C 13/04; F17C 2221/012; F17C 2223/0123
See application file for complete search history.

(56) References Cited

U.S. PATENT DOCUMENTS 2,274,145 A * 2/1942 Johnson .................... F16K 1/42
137/468
2,505,321 A 4/1950 Brutocao et al.
(Continued)

FOREIGN PATENT DOCUMENTS

CN 203784440 U 8/2014
DE 60013383 T2 9/2005
(Continued)

OTHER PUBLICATIONS

Translation of International Search Report for Application No. PCT/EP2019/077293 dated Feb. 7, 2020 (3 pages).

*Primary Examiner* — Patrick C Williams
(74) *Attorney, Agent, or Firm* — Michael Best & Friedrich LLP

(57) ABSTRACT

The invention relates to a valve device (100) for a gaseous medium, in particular hydrogen, comprising a valve housing (6) which comprises a closing element (14) that is arranged therein and can be moved in the longitudinal axis (18). The closing element (14) interacts with a seal seat (16) in order to release and close a through-opening (22). The valve housing (6) is equipped with at least one spring element (8) which is supported against the closing element (14) and the valve housing (6). Furthermore, the at least one spring element (8) is made of a bimetal.

9 Claims, 2 Drawing Sheets

(51) Int. Cl.
*F16K 27/02* (2006.01)
*F17C 13/04* (2006.01)

(52) U.S. Cl.
CPC .............................. *F17C 2221/012* (2013.01); *F17C 2223/0123* (2013.01)

(56) References Cited

U.S. PATENT DOCUMENTS

| | | | |
|---|---|---|---|
| 4,508,314 A * | 4/1985 | Hemme | F16K 31/025 236/68 R |
| 4,522,219 A | 6/1985 | Ohkata | |
| 4,667,694 A | 5/1987 | Dalton | |
| 5,255,809 A | 10/1993 | Ervin et al. | |
| 6,427,712 B1 | 8/2002 | Ashurst | |
| 2006/0016902 A1* | 1/2006 | Restivo | E03C 1/086 236/93 R |
| 2010/0078081 A1* | 4/2010 | McKee | F16K 31/002 137/468 |
| 2013/0174936 A1* | 7/2013 | Maier | F03G 7/06 141/1 |
| 2015/0285389 A1 | 10/2015 | Mulder | |
| 2016/0033085 A1* | 2/2016 | Sirosh | F17C 13/12 137/2 |

FOREIGN PATENT DOCUMENTS

| | | |
|---|---|---|
| DE | 102018209057 A1 | 12/2019 |
| JP | S4725720 A | 10/1972 |
| JP | S5635874 A | 4/1981 |
| JP | S5986769 A | 5/1984 |
| JP | H0611070 A | 1/1994 |
| WO | 2005028932 A1 | 3/2005 |
| WO | 2014135879 A1 | 9/2014 |

* cited by examiner

VALVE DEVICE FOR A GASEOUS MEDIUM, AND TANK DEVICE FOR STORING COMPRESSED FLUIDS

BACKGROUND OF THE INVENTION

The invention relates to a valve device for a gaseous medium and to a tank device for a fuel cell tank, in particular for storing hydrogen, for example for use in vehicles with fuel cell drive.

DE 10 2018 209 057 A1, which was not published before the priority date of the present application, describes a tank device for temperature-based release of pressure from a fuel cell tank, wherein the tank device comprises tank vessels with a multiplicity of valves, for example a safety fuse valve, which ensure correct and reliable functioning of an overall system, for example of a fuel cell system.

The safety devices for such a tank device are standardized. Here, every tank device must have such a safety fuse valve. Accordingly, the safety fuse valve can, for example in the event of fire or an increase in temperature beyond a predetermined threshold value, ensure that, for example, the hydrogen can be conducted out of the storage unit in order to prevent an explosion of the storage unit or even of the gas storage system as a whole.

If the temperature exceeds the predetermined threshold value, then, in general, a device at the safety fuse valve, for example a thermally activated pressure relief device (TPRD), fuses and triggers an irreversible opening of the safety fuse valve.

The storage unit can however be refilled only when a new safety fuse valve is used.

BACKGROUND OF THE INVENTION

The valve device according to the invention has the advantage over this that, despite temperature-sensitive switching of the valve device, reliable re-closure with the same valve device is possible.

For this purpose, the valve device for a gaseous medium, in particular hydrogen, has a valve housing in which there is arranged a closing element which is movable relative to a longitudinal axis. The closing element interacts with a sealing seat in order to open up and close a passage opening, wherein, in the valve housing, there is arranged at least one spring element. The at least one spring element is supported on the closing element and on the valve housing. Furthermore, the at least one spring element is produced from a bimetallic strip.

Bimetallic strips are distinguished by the fact that they are typically produced from layers of two different metals which are connected cohesively or in positively locking fashion to one another. Owing to the different coefficients of thermal expansion of the metals, bimetallic strips deform in the event of a temperature change. The valve device is thus controllable by means of a temperature change at the spring element.

In a first advantageous refinement, it is provided that the passage opening can be opened up and closed by means of temperature changes at the bimetallic strip. The valve device can thus be reversibly opened up without having to be replaced for further use.

In a further configuration of the invention, it is advantageously provided that the closing element comprises a conical region, wherein the conical region interacts with the sealing seat.

In one advantageous refinement, it is provided that the closing element comprises a conically widened region, wherein the conically widened region interacts with the sealing seat.

The configuration of the sealing seat is selected such that reliable leak-tightness is attained at the closing element.

The described valve device is preferably suitable in a tank device for storing compressed fluids, in particular hydrogen, having a tank. The tank advantageously comprises a tank housing with a neck region, in which neck region the valve device is arranged, wherein the valve housing is at least partially integrated into the tank housing. The sealing seat is advantageously formed on a conically widened region of the tank housing.

The described tank device is preferably suitable in a fuel cell arrangement for storing hydrogen for the operation of a fuel cell.

BRIEF DESCRIPTION OF THE DRAWINGS

Exemplary embodiments of a valve device according to the invention for a gaseous medium, in particular hydrogen, and a tank device according to the invention for storing compressed fluids, are illustrated in the drawing. In the drawing.

DETAILED DESCRIPTION

Figure 1:
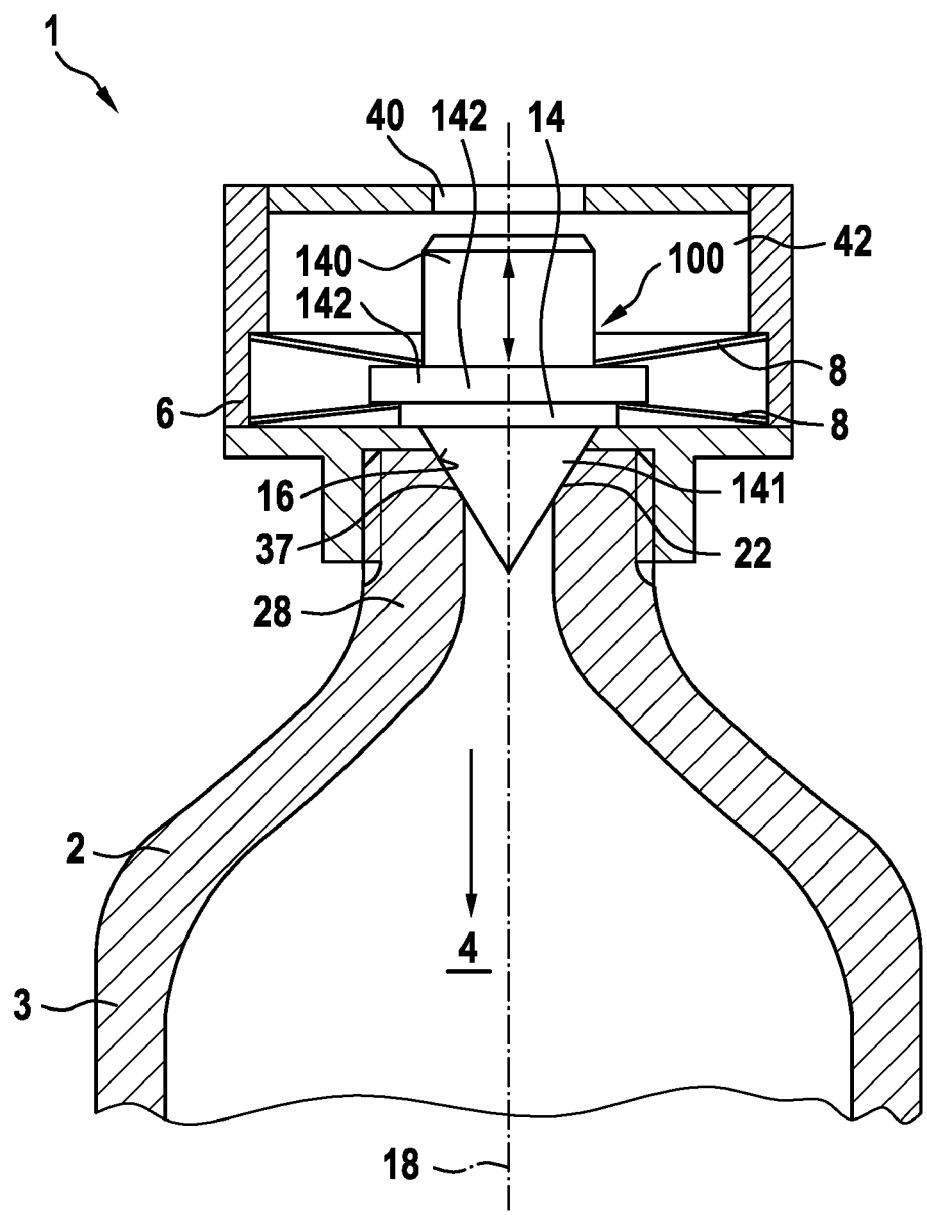
FIG. 1 shows a first exemplary embodiment of a valve device according to the invention in a tank device in longitudinal section.

FIG. 1 shows a first exemplary embodiment of a valve device 100 according to the invention for a gaseous medium in longitudinal section. The valve device 100 is arranged in a tank device 1 according to the invention for storing compressed fluids, in particular hydrogen.

The valve device 100 has a valve housing 6 with a longitudinal axis 18. A passage opening 22 and an outlet opening 40 are formed in the valve housing 6, which openings issue into an interior space 42 of stepped form.

In the interior space 42, there is arranged a closing element 14 which is movable relative to the longitudinal axis 18 and which interacts with a sealing seat 16 of conical form for the purposes of opening up and closing the passage opening 22. The closing element 14 comprises a cylindrical region 140 and a conical region 141, wherein the conical region 141 interacts with the sealing seat 16. Between the cylindrical region 140 and the conical region 141, the closing element 14 has a step-like region 142.

The closing element 14 is acted on with a force by means of a spring element 8 in the interior space 42, which spring element is supported between the valve housing 6 and the step-like region 142 of the closing element 14. In a closed position, the closing element 14 lies on the sealing seat 16. Here, the spring element 8 is produced from a bimetallic strip.

The valve device 100 is part of a tank device 1 with a tank 2. The tank 2 has a tank housing 3 in which a tank interior space 4 is formed. The tank housing 3 has a neck region 28 on which the valve device 100 is arranged. Here, said valve device is integrated into the tank housing 3 and, here, closes the tank interior space 4 to the outside. The sealing seat 16 is formed on a conically widened region 37 of the tank housing 3.

Functioning of the Valve Device

The valve device 100 is formed here as a safety fuse valve or as a thermally activated pressure relief device (TPRD). This means that, for example in the presence of temperatures below 110° C., the valve device 100 remains closed, such that gaseous medium that is present at high pressure in the tank 2 is enclosed in the tank 2. If the temperature exceeds for example 110° C., a temperature change is caused in the spring element 8 in the form of a bimetallic strip, which temperature change, owing to the different coefficients of thermal expansion of the two metals in the bimetallic strip, leads to bending of the bimetallic strip and thus of the spring element 8. This leads to a change in the forces on the closing element 14, such that the latter lifts off from the sealing seat 16 and opens up the passage opening 22. Gaseous medium now flows out of the tank 2 via the passage opening 22 in the direction of the outlet opening 40. Here, the closing element 14 opens into the interior space 42 of the valve device 100.

Depending on the temperature change at the spring element 8 formed as a bimetallic strip, it is thus possible for the stroke of the closing element 14 to be controlled by bending of the bimetallic strip. The spring element 8 is thus formed as a temperature-sensitive bimetallic strip switch, which is switchable for example in 5° C. steps between for example a temperature of 70° C. to 180° C. The desired functioning can be ensured in a manner dependent on the selection of the metals for the bimetallic strip.

If the temperature falls below 110° C. again, then the bending of the spring element 8 in the form of the bimetallic strip leads again to a change in the forces on the closing element 14, such that this moves in the direction of the sealing seat 16 again and sets down on the sealing seat 16. The passage opening 22 is closed again, and no further gaseous medium flows out of the tank 2.

This valve device 100 allows an opening or closing of the tank 2 in accordance with temperature changes.

Figure 2:
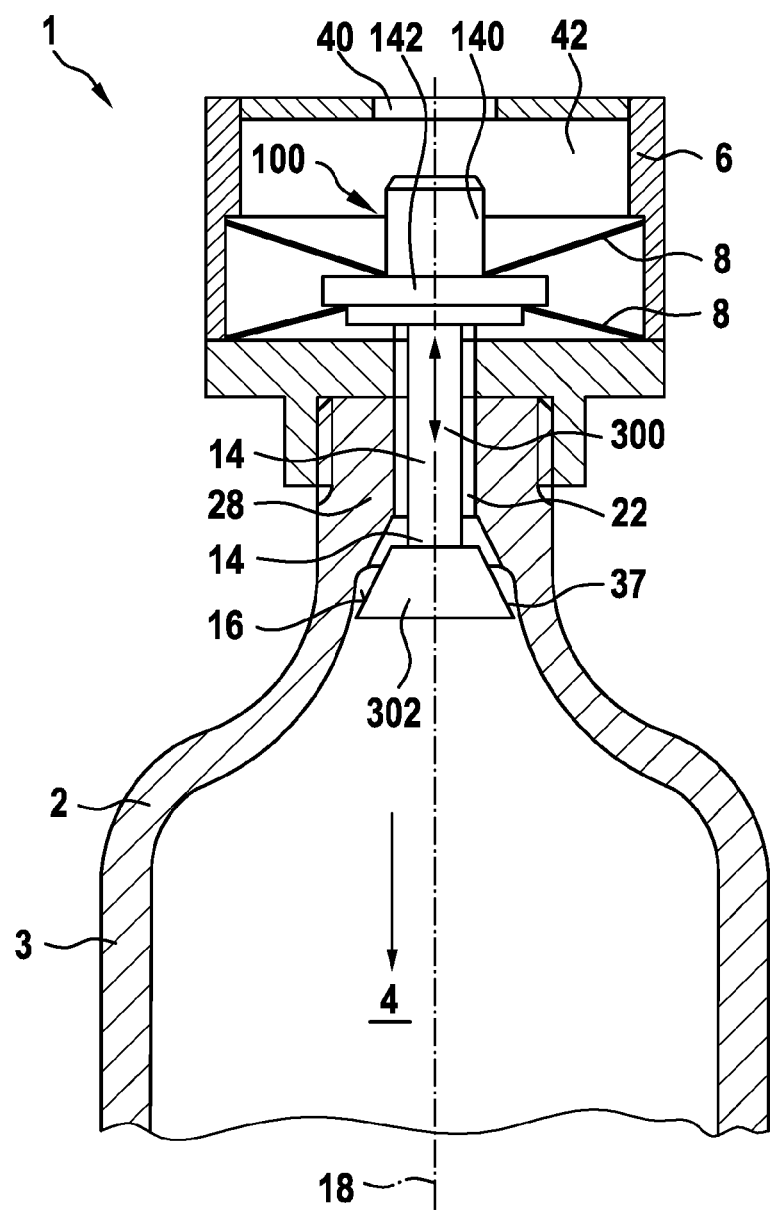
FIG. 2 shows a second exemplary embodiment of a valve device according to the invention in a tank device in longitudinal section.

FIG. 2 shows a second exemplary embodiment of the valve device 100 according to the invention for a gaseous medium in longitudinal section. Components of identical function have been denoted by the same reference designations.

The second exemplary embodiment substantially corresponds in terms of function and construction to the first exemplary embodiment. The configuration and movement of the closing element 14 differ here.

Here, the closing element 14 comprises the cylindrical region 140, which is adjoined by the step-like region 142. The step-like region 142 is in turn adjoined by a cylindrical region 300, which is adjoined by a conically widened region 302. The conically widened region 302 interacts here with the sealing seat 16.

By contrast to the first exemplary embodiment, the closing element 14 in this case opens into the tank interior space 4.

What is claimed is:

1. A tank device (1) for storing compressed fluids, the tank device having a tank (2) and having a valve device (100) for a gaseous medium, the valve device having a valve housing (6), the valve housing (6) having arranged therein a closing element (14) which is movable relative to a longitudinal axis (18), wherein the closing element (14) interacts with a sealing seat (16) in order to open up and close a passage opening (22) by moving relative to a fully sealed position wherein the closing element (14) contacts the sealing seat (16), wherein, in the valve housing (6), there is arranged at least one spring element (8) supported on the closing element (14) and on the valve housing (6), wherein the at least one spring element (8) is produced from a bimetallic strip, and wherein the valve device is configured such that temperature changes at the bimetallic strip deform the bimetallic strip to lift the closing element (14) off the sealing seat (16) from the fully sealed position, wherein the tank (2) comprises a tank housing (3) with a neck region (28), in which the valve device (100) is arranged, wherein the valve housing (6) is at least partially integrated into the tank housing (3), and wherein the sealing seat (16) is formed on a conically widened region (37) of the tank housing (3).

2. The tank device (1) as claimed in claim 1, characterized in that the closing element (14) comprises a conical region (141), wherein the conical region (141) interacts with the sealing seat (16).

3. The tank device (1) as claimed in claim 1, characterized in that the closing element (14) comprises a conically widened region (302), wherein the conically widened region (302) interacts with the sealing seat (16).

4. A fuel cell arrangement having the tank device (1) as claimed in claim 1 for storing hydrogen for the operation of a fuel cell.

5. The tank device (1) as claimed in claim 1, characterized in that the bimetallic strip is configured to bend to lift the closing element (14) off the sealing seat (16) when a temperature of the valve device rises above a threshold temperature.

6. The tank device (1) as claimed in claim 5, characterized in that the bimetallic strip is configured to bend to move the closing element (14) back onto the sealing seat (16) when a temperature of the valve device falls back below the threshold temperature.

7. The tank device (1) as claimed in claim 5, characterized in that the threshold temperature is 110 degrees Celsius.

8. The tank device (1) as claimed in claim 5, wherein the bimetallic strip comprises a first metal with a first thermal expansion coefficient and a second metal with a second thermal expansion coefficient, characterized in that the bending of the bimetallic strip is caused by a difference between the first and the second thermal expansion coefficient.

9. The tank device (1) as claimed in claim 1, characterized in that the bimetallic strip is the sole mechanism to actuate the valve device (100).

* * * * *